(12) United States Patent
Tanaka et al.

(10) Patent No.: US 9,403,502 B2
(45) Date of Patent: Aug. 2, 2016

(54) BAG BODY

(71) Applicant: SUMISHO AIRBAG SYSTEMS CO., LTD., Matsuura-shi, Nagasaki (JP)

(72) Inventors: Takeshi Tanaka, Matsuura (JP); Masatoshi Yoshida, Matsuura (JP); Teppei Harabayashi, Matsuura (JP)

(73) Assignee: SUMISHO AIRBAG SYSTEMS CO., LTD., Matsuura-Shi (JP)

( * ) Notice: Subject to any disclaimer, the term of this patent is extended or adjusted under 35 U.S.C. 154(b) by 31 days.

(21) Appl. No.: 14/396,323

(22) PCT Filed: Feb. 27, 2013

(86) PCT No.: PCT/JP2013/055150
§ 371 (c)(1),
(2) Date: Oct. 22, 2014

(87) PCT Pub. No.: WO2013/161379
PCT Pub. Date: Oct. 31, 2013

(65) Prior Publication Data
US 2015/0151710 A1 Jun. 4, 2015

(30) Foreign Application Priority Data
Apr. 23, 2012 (JP) ................. 2012-097318

(51) Int. Cl.
*B60R 21/2338* (2011.01)
*B60R 21/235* (2006.01)
(Continued)

(52) U.S. Cl.
CPC ........... *B60R 21/2338* (2013.01); *B60R 21/232* (2013.01); *B60R 21/235* (2013.01);
(Continued)

(58) Field of Classification Search
CPC ............... B60R 21/2338; B60R 2021/23576; B60R 2021/23538; B60R 2021/23542; B60R 2021/23547; B60R 2021/23382; D03D 11/02; D03D 1/02; D10B 2505/124

USPC .......................... 139/389; 428/34.1
See application file for complete search history.

(56) References Cited

U.S. PATENT DOCUMENTS

| 5,865,464 A | 2/1999 | Kanuma et al. |
| 6,296,276 B1 * | 10/2001 | Ritter .................... B60R 21/232 280/728.1 |

(Continued)

FOREIGN PATENT DOCUMENTS

| DE | 3903216 A1 | 8/1990 |
| JP | 2001-138852 A | 5/2001 |

(Continued)

OTHER PUBLICATIONS

International Search Report issued in PCT/JP2013/055150, mailed on Apr. 9, 2013.

(Continued)

*Primary Examiner* — James English
(74) *Attorney, Agent, or Firm* — Birch, Stewart, Kolasch & Birch, LLP

(57) ABSTRACT

Provided is an airbag having a function for controlling bag-section expansion while also retaining air-tightness, by reducing the concentration of stress applied to restriction threads during deployment. Provided is a bag body having, in the interior, restriction threads for restricting expansion, wherein the restriction threads comprise: first yarn extending in the interior of the bag body from a non-expanding section to a different non-expanding section; second yarn which forms a base fabric of one side of an expanding section of the bag body and which is separated from the one side and is caught on the first yarn, or is woven with the first yarn to constitute a structure, again returning to the base fabric of the one side; and third yarn which forms a base fabric of the other side of the expanding section of the bag body and which is separated from the other side and is caught on the first yarn, or is woven with the first yarn to constitute a structure, again returning to the base fabric of the other side.

7 Claims, 3 Drawing Sheets

(51) Int. Cl.
 *D03D 1/02* (2006.01)
 *B60R 21/232* (2011.01)
 *D03D 11/02* (2006.01)

(52) U.S. Cl.
 CPC ............... *D03D 1/02* (2013.01); *D03D 11/02* (2013.01); *B60R 2021/23382* (2013.01); *B60R 2021/23509* (2013.01); *B60R 2021/23519* (2013.01); *B60R 2021/23547* (2013.01); *D10B 2331/02* (2013.01); *D10B 2331/04* (2013.01); *D10B 2505/124* (2013.01)

(56) References Cited

U.S. PATENT DOCUMENTS 7,635,144 B2 * 12/2009 Kim ...................... B60R 21/235
 139/383 R
2009/0224521 A1 * 9/2009 Huber ...................... D03D 1/02
 280/743.1
2013/0113195 A1 * 5/2013 Finn .................... B60R 21/2338
 280/743.2

FOREIGN PATENT DOCUMENTS

| WO | WO 95/20507 A1 | 8/1995 |
| WO | WO 2007/100377 A1 | 9/2007 |
| WO | WO 2012/031643 A1 | 3/2012 |

OTHER PUBLICATIONS

Extended European Search Report for European Application No. 13782437.1, dated Sep. 2, 2015.

* cited by examiner

ID BAG BODY

TECHNICAL FIELD

The present invention relates to a bag body having thereinside restriction threads for restricting inflation. More particularly, the present invention relates to a vehicle airbag.

BACKGROUND ART

Nowadays, there are increasingly higher safety requirements for vehicles than ever before. At the same time, the comfort of a spacious car interior is also required. Therefore, not only the compactness of an installed airbag is required, but there is also a trend toward downsizing of an inflator which generates an expansion gas, and an airbag capable of fully delivering its performance even with a small amount of gas is becoming necessary. Accordingly, it is necessary to effectively use the gas by preventing the airbag from inflating more than necessary. One example of a bag body related to this requirement is disclosed in Patent Literatures 1 and 2. These are airbags including restriction threads for restricting the distance between base fabrics during inflation of the airbag, and part of the threads constituting one side of the base fabric extends toward the other side of the base fabric and is connected to it.

CITATION LIST

Patent Literature

PATENT LITERATURE 1: WO 95/20507
PATENT LITERATURE 2: JP-A-2001-138852

SUMMARY OF INVENTION

Technical Problem

In the airbags described in Patent Literatures 1 and 2, the inflation of the airbag can indeed be controlled by means of the restriction threads. However, as these restriction threads try to control the volume of the airbag against the pressure of the inflating bag section during its expansion, the restriction threads are subjected to a stress corresponding to the pressure and the volume. Especially when the region where the inflating section is present is large, a large inflation force is generated and the stress concentrates at the start point and the end point of the restriction threads. As a result, slippage of the threads occurs in such parts and the coating layer is broken, which may cause serious damage to the airtightness. In order to avoid this phenomenon, an excessive resin coating would be required. Accordingly, the manufacturing cost per unit increases, as well as the airbag becomes bulky, which may reduce the ease of storage.

The object of the present invention is to provide an airbag which has a feature of controlling the inflation of a bag section while maintaining the airtightness by reducing stress concentration on the restriction threads during expansion of the airbag.

Solution to Problem

In order to solve the above problems, the present invention provides a bag body having thereinside restriction threads for restricting inflation, wherein the restriction threads include: first yarn extending inside the bag body from a non-inflating section to another non-inflating section; second yarn forming a base fabric of one side of an inflating section of the bag body, the second yarn leaving the base fabric of the one side, being caught on the first yarn or constituting a weave structure with the first yarn, and returning to the base fabric of the one side and being woven into the base fabric; and third yarn forming a base fabric of the other side of the inflating section of the bag body, the third yarn leaving the base fabric of the other side, being caught on the first yarn or constituting a weave structure with the first yarn, and returning to the base fabric of the other side and being woven into the base fabric.

Advantageous Effects of Invention

The configuration of the bag body of the present invention makes it possible to add a feature of controlling the inflation of the bag section while maintaining the airtightness. This is because the yarn bridging between the non-inflating sections adjacent to the inflating section, which is to be controlled, has a function to reinforce the restriction threads. That is, thanks to this yarn bearing a part of the stress during expansion of the airbag, it is possible to reduce the stress exerted on the start point and the end point of the restriction threads, and thereby to reduce the slippage of the threads and maintain the airtightness.

DESCRIPTION OF EMBODIMENTS

Figure 1:
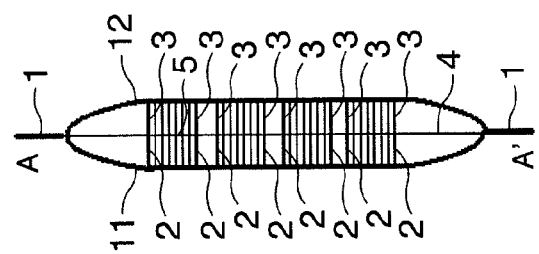
FIG. 1 is a schematic cross-sectional view showing a bag body of the present invention.
Figure 1:
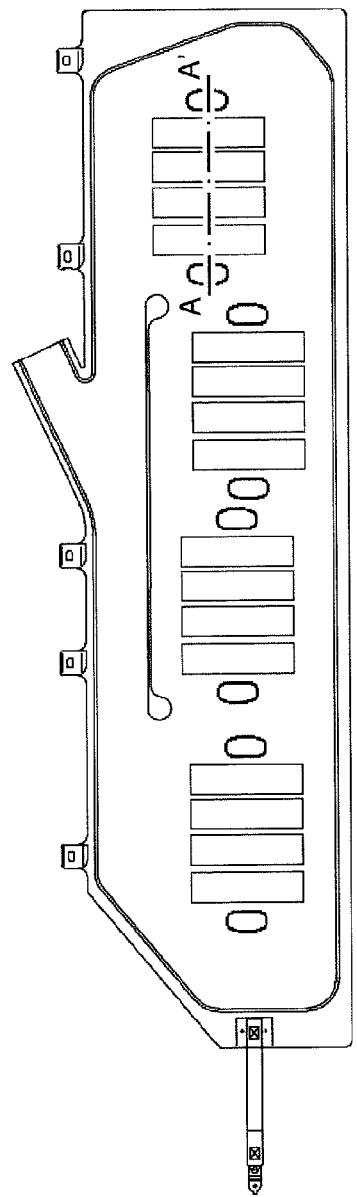

Embodiments for implementing the present invention will be described in detail.

A bag body of the present invention is a bag body having thereinside restriction threads for restricting inflation, wherein the restriction threads include: first yarn extending inside the bag body from a non-inflating section to another non-inflating section; second yarn forming a base fabric of one side of an inflating section of the bag body, the second yarn leaving the base fabric of the one side, being caught on the first yarn or constituting a weave structure with the first yarn, and returning to the base fabric of the one side and being woven into the base fabric; and third yarn forming a base fabric of the other side of the inflating section of the bag body, the third yarn leaving the base fabric of the other side, being caught on the first yarn or constituting a weave structure with the first yarn, and returning to the base fabric of the other side and being woven into the base fabric.

The fabric used for the bag body of the present invention is a woven fabric, and the yarn extending from one non-inflating section to another non-inflating section without weaving the base fabric are used to form the restriction threads. As for the restriction threads intersecting with this yarn, the yarn constituting the base fabric are used.

The tensile strength of the thread used is preferably 30 N/thread or higher. A tensile strength of 40 N/thread or higher is particularly preferable. If the tensile strength is within this range, there is no need to use an excessively large number of threads to withstand the stress during inflation, and the design flexibility is not restricted.

The elongation percentage of the restriction thread used can be suitably 16% to 30%. If the elongation percentage is within this range, the stress exerted on the start point and the end point of the restriction threads does not become excessive, and the inflation volume can be effectively controlled. Such yarn can be obtained through extrusion and hot stretching of a molten polymer, and can be produced by changing the stretching conditions (the stretching ratio and the stretching temperature).

The density of the restriction threads leaving the base fabric is suitably 0.1 to 1.5 thread/cm$^2$ relative to the area of the bag body inflating section. If the density is within this range, opening of the threads at the start point and the end point of the restriction threads can be minimized, and at the same time, the design flexibility is not interfered by the region where the restriction threads are present.

The region where the restriction threads are present can be suitably adopted to be 10 to 95% relative to the area of the bag body inflating section. If the region is within this range, excessive inflation of the volume of the bag body can be suppressed, and at the same time, the design flexibility is not interfered by the region where the restriction threads are present.

The length of the second yarn and the third yarn of the restriction threads from the point of leaving the base fabric to the point of returning to the base fabric is suitably 5 to 40 cm. If the length is within this range, the inflation volume can be controlled, and when the airbag is used for a side curtain bag, the expanded bag can slide into the space between the window and an occupant without difficulty. These adjustments can be easily changed using a weaving program.

Setting the thickness of the inflating section during inflation of the airbag of the present invention to 50 to 200 mm makes it possible to control the inflation volume without causing injury to the occupant or increasing the risk of throwing the occupant out of the vehicle. This adjustment can be made through the length of the restriction threads and a weaving method of the first to third yarn of the restriction threads, but in practice, it is necessary to measure the dimensions of the airbag when inflated and to adjust the length of the restriction threads.

The base fabric having the structure of the present invention is subjected to refining for removing a sizing agent used during weaving. Known methods including a batch-wise method like a method using a jigger machine and a continuous refining method can be used. To impart airtightness, the surface is coated or laminated with a resin. In the case of coating, a known substance, for example, a silicone resin, a urethane resin, and chloroprene elastomer can be used. From the viewpoint of inflammability and flexibility, a silicone resin can be suitably used. In the case of lamination, a known substance such as a polyamide resin or a polyvinyl chloride resin can be used. In addition, known methods can be used such as previously treating the base fabric with a resin, such as a polyolefin resin, which contributes to bonding, or treating the base fabric with a bonding layer disposed on one side of the film. From the viewpoint of airtightness and environment, a multilayered film having a polyamide-polyamide polyether copolymer film on the gas barrier side and a polyolefin film on the bonding side is effective, but the present invention is not limited to these examples.

EXAMPLES

In the following, examples of the present invention will be described.

Measured values were obtained under the following conditions and evaluated:

(Thread strength and elongation percentage) The same yarn as those constituting the base fabric were separately prepared, and TENSILON of A&D Company, Limited was used for the measurement. Five measurements were made with the sample length of 200 mm and the tension speed of 200 mm/min, and the average was recorded.

(Fabric strength and elongation percentage) In accordance with HS L1096, five measurements were made with the width of 50 mm, the measurement length of 200 mm, and the tension speed of 200 mm/min using TENSILON of A&D Company, Limited, and the average was recorded.

(Airtightness) A test airbag was filled with air to a pressure of 17.5 kPa, and then the valve is closed, changes in the internal pressure of the airbag were recorded, and the pressure six seconds after the valve had been closed was evaluated.

Example 1

A 466 dtex/96f polyethylene-terephthalate fiber having a strength of 33.3 N and an elongation percentage of 23.6% was sized with an ester sizing agent, and then 10000 of this fiber were aligned in parallel to create a warp beam. Next, an airbag was woven with 57 warps/inch and 49 wefts/inch using an airjet weaving machine with a Jacquard loom.

As shown in FIG. 1, the airbag according to this example has a bag body which is constituted of two fabrics joined to each other at an outer peripheral joint part provided on the outer peripheral edge and an inner joint part provided inside the outer peripheral joint part. The joint parts are non-inflating sections which do not inflate during expansion of the airbag.

The airbag has restriction threads inside for restricting the inflation during expansion of the airbag. The restriction threads are constituted of multiple yarns. First, five yarns 4 extending from a non-inflating section 1 to another non-inflating section 1 are passed to the inside of the airbag at a rate of one in ten. Next, yarn 2, which forms a base fabric 11 of one side of an inflating section of the airbag, leaves the base fabric at a rate of one in four and constitutes a plain weave structure section 5 with the yarns 4. Then, the yarn 2 is woven back into the original base fabric. On the other hand, yarn 3, which forms a base fabric 12 of the other side of the inflating section of the airbag, leaves the base fabric at a rate of one in four and constitutes the plain weave structure section 5 with the yarn 4. Then, the yarn 3 is woven back into the original base fabric. The length of the yarn 2 and yarn 3 (length of the restriction thread) from the point of leaving the base fabric 11 or 12 to the point of returning to the base fabric is 23 cm. The region (the rectangular portion in FIG. 1) of the restriction threads relative to the bag inflating section is set to be 70.5%. Although the restriction threads are shown in FIG. 1, they are represented in a simplified manner and the actual number of the threads is not shown.

Subsequently, the airbag was immersed in a 60° C. solution of 1 g/L sodium carbonate, and then passed through a 80° C. steam tank for 30 seconds and washed with water at 90° C. for one minute. After being dried for one minute using a heating roller at 100° C., the airbag was heat set and rolled up with a tenter at 210° C. for 30 seconds. Next, the airbag was coated with a silicone resin using a coater to a target value of 69 g/m$^2$, and after being treated at 180° C. for two minutes the airbag was further coated with a topcoat to 8 g/m$^2$ and treated at 200° C. for one minute. This process was performed twice in total, once on each of the front and back of the base fabric. The coated fabric thus obtained was subjected to an airtightness test. Table 1 shows the results.

Example 2

A 470dtex/72f nylon 66 fiber having a strength of 40 N/fiber and an elongation percentage of 21% was sized with a polyacrylic sizing agent, and 10000 of this fiber were aligned in parallel to create a warp beam. Next, an airbag was woven with 57 warps/inch and 49 wefts/inch using an airjet weaving machine equipped with a Jacquard device for warp control.

Similarly to Example 1, the structure of the airbag was of the configuration shown in FIG. 1. Subsequently, the airbag was immersed in a 60° C. solution of 7.4 g/L sodium hydrate, and then passed through a 80° C. steam tank for 30 seconds and washed with water at 90° C. for one minute. After being dried for one minute using a heating roller at 100° C., the airbag was heat set and rolled up with a tenter at 150° C. for 30 seconds. Next, the airbag was coated with a silicone resin using a coater to 69 g/m$^2$, and after being treated at 180° C. for two minutes the airbag was further coated with a topcoat to 8 g/m$^2$ and treated at 200° C. for one minute. This process was performed twice in total, once on each of the front and back of the base fabric. The coated fabric thus obtained was subjected to an airtightness test. Table 1 shows the results.

Example 3

The same yarn as those of Example 1 was used. However, the plain weave structure section 5 of FIG. 1 did not made to have a plain weave structure. Instead, a bag body was woven to have a structure in which the yarn 2 and the yarn 3 were simply caught on the yarn 4. The subsequent process was the same as in Example 1, and the same airtightness test was performed. Table 1 shows the results.

Example 4

The same yarn as those of Example 1 was used, while the structure of the restriction threads was different from that of Example 1. First, as with Example 1, five yarns 4, which extend from the non-inflating section 1 to the other non-inflating section 1, are passed to the inside of the airbag at a rate of one in ten. Then, the yarn 2, which forms the base fabric 11 of the one side of the inflating section of the airbag, leaves the base fabric at a rate of one in ten and constitutes the plain weave structure section 5 with the yarn 4, and is woven back into the original base fabric. The yarn 3, which forms the base fabric 12 of the other side of the inflating section of the airbag, leaves the base fabric at a rate of one in ten and constitutes the plain weave structure section 5 with the yarn 4, and is woven back into the original base fabric. The thread length of the yarn 2 and yarn 3 from the point of leaving the base fabric 11 or 12 to the point of returning to the base fabric was 23 cm. Thereafter, the same process as in Example 1 was performed and an airtightness test was performed. Table 1 shows the results.

Example 5

Example 6

Compared with Example 1, the area where the restriction threads are present (the area ratio of the restriction thread part to the inflating section) was made smaller in Example 5 and larger in Example 6. The subsequent process was the same as in Example 1, and the same airtightness test was performed. Table 1 shows the results.

Example 7

Example 8

The same yarn as those of Example 1 was used, but the length of the yarn 2 and yarn 3 as 10 cm in Example 7 and 35 cm in Example 8. The subsequent process was the same as in Example 1, and the same airtightness test was performed. Table 1 shows the results.

Comparative Example 1

Figure 2:
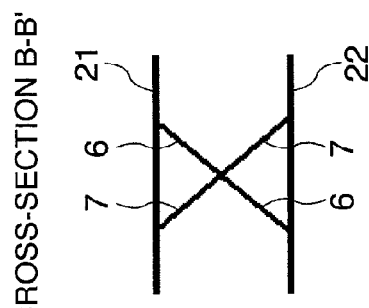
FIG. 2 is a schematic cross-sectional view showing a bag body of Comparative example 1.
Figure 2:
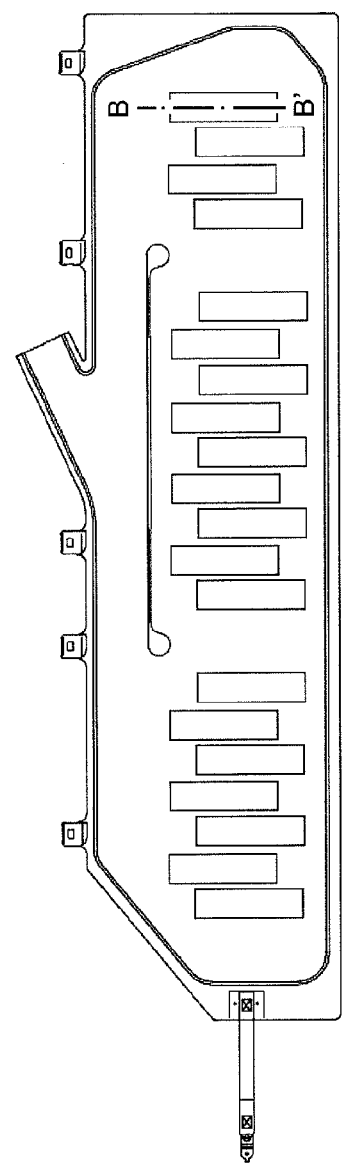

An airbag was woven with the same yarn as those of Example 1. As shown in FIG. 2, yarn 7 constituting a base fabric 21 of one side of the inflating section of the airbag leaves the base fabric 21 at a rate of one in four, extends toward a base fabric 22 of the other side, and is eventually woven into the base fabric 22. On the other hand, yarn 6 constituting the base fabric 22 leaves the base fabric 22 at a rate of one in four, extends toward the opposite base fabric 21, and is eventually woven into the base fabric 21. These yarn 6 and yarn 7 constitute the restriction threads. As shown in the cross-section B-B', the structure of these restriction threads is X-shaped. The length of the yarn 6 and yarn 7 was 23 cm. The subsequent process was the same as in Example 1, and the same airtightness test was performed. Table 1 shows the results.

Comparative Example 2

Figure 3:
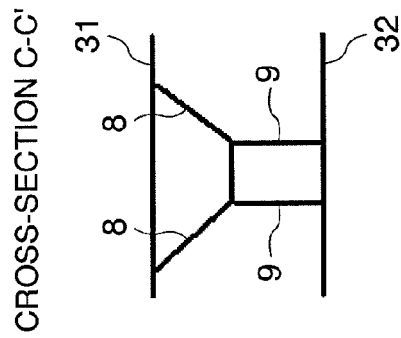
FIG. 3 is a schematic cross-sectional view showing a bag body of Comparative example 2.
Figure 3:
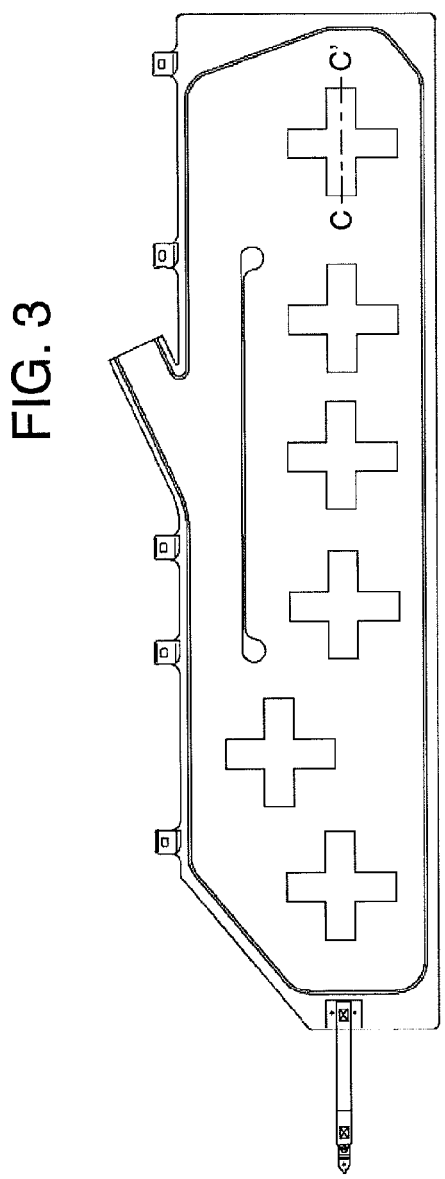

An airbag was woven with the same yarn as those of Example 1. As shown in FIG. 3, yarn 8 constituting a base fabric 31 of one side of the inflating section of the airbag leaves the base fabric 31 at a rate of one in four, and yarn 9 constituting a base fabric 32 of the other side leaves the base fabric 32 at a rate of one in four so that the yarn 8 and the yarn 9 are perpendicular to each other. After constituting a plain weave structure inside the airbag, the yarn 8 and the yarn 9 are woven back into the respective original base fabrics. As shown in the cross-section C-C', the structure of these restriction threads is Y-shaped. The subsequent process was the same as in Example 1, and the same airtightness test was performed. Table 1 shows the results.

TABLE 1

|  |  | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|---|
| Raw yarn |  | PET | N66 | PET | PET | PET | PET | PET | PET | PET | PET |
| Fiber strength | N | 33.3 | 40 | 33.3 | 33.3 | 33.3 | 33.3 | 33.3 | 33.3 | 33.3 | 33.3 |
| Fineness | dtex | 466 | 470 | 466 | 466 | 466 | 466 | 466 | 466 | 466 | 466 |
| Number of filaments | filament | 96 | 72 | 96 | 96 | 96 | 96 | 96 | 96 | 96 | 96 |

TABLE 1-continued

| | | Example 1 | Example 2 | Example 3 | Example 4 | Example 5 | Example 6 | Example 7 | Example 8 | Comparative example 1 | Comparative example 2 |
|---|---|---|---|---|---|---|---|---|---|---|---|
| Fiber strength | cN/dtex | 7.1 | 8.5 | 7.1 | 7.1 | 7.1 | 7.1 | 7.1 | 7.1 | 7.1 | 7.1 |
| Fiber elongation percentage | % | 23.6 | 20.5 | 23.6 | 23.6 | 23.6 | 23.6 | 23.6 | 23.6 | 23.6 | 15 |
| Density | Warp | thread/inch | 57 | 57 | 57 | 57 | 57 | 57 | 57 | 57 | 57 | 57 |
| | Weft | thread/inch | 49 | 49 | 49 | 49 | 49 | 49 | 49 | 49 | 49 | 49 |
| Base fabric strength | Warp | N/5 cm | 3460 | 3750 | 3470 | 3477 | 3477 | 3474 | 3478 | 3477 | 3130 | 4186 |
| | Weft | N/5 cm | 3050 | 3590 | 3050 | 3045 | 3045 | 3045 | 3055 | 3044 | 2750 | 3111 |
| Base fabric elongation percentage | Warp | % | 39.0 | 37.2 | 28.0 | 28.0 | 28.0 | 29.0 | 29.0 | 28.0 | 39.0 | 27.0 |
| | Weft | % | 36.0 | 31.8 | 35.0 | 33.0 | 33.0 | 33.0 | 34.0 | 33.0 | 43.0 | 24.0 |
| Bag section internal structure | | | Plain weave | Plain weave | Caught-on | Plain weave | Plain weave | Plain weave | Plain weave | Plain weave | X-shaped | Y-shaped |
| Area ratio of restriction thread part to inflating section | % | 70.5 | 70.5 | 70.5 | 70.5 | 17.1 | 88.0 | 70.5 | 56.4 | 70.5 | 70.5 |
| Density of restriction thread at start point | thread/cm^2 | 1.2 | 1.2 | 1.2 | 0.5 | 0.4 | 1.3 | 1.2 | 0.9 | 1.2 | 1.2 |
| Restriction thread length | cm | 23.0 | 23.0 | 23.0 | 23.0 | 23.0 | 23.0 | 10.0 | 35.0 | 23.0 | 23.0 |
| Airtightness | kPa (6 s later) | 15 | 14 | 14 | 15 | 10 | 16 | 14 | 15 | 4 | 5 |
| Judgment | | ○ | ○ | ○ | ○ | Δ | ○ | ○ | ○ | x | x |

As shown in Table 1, the airtightness six seconds after the valve had been closed was favorably maintained in Examples 1 to 8 of the present invention as compared with Comparative examples 1 and 2. It is likely that, due to the structure of the restriction threads which contains the yarn passed across the non-inflating sections, the stress exerted on the start point and the end point of the restriction threads was reduced in Examples of the present invention, and as a result, slippage of the threads was suppressed and the internal pressure was favorably maintained. It is likely that, in Comparative examples, by contrast, a relatively large stress during inflation was applied to the start point and the end point of the restriction threads and slippage of the threads occurred, so that the internal pressure was not sufficiently maintained.

The present invention has provided an airbag which delivers its performance even with a small amount of gas and realizes both the compactness and the occupant protection performance.

REFERENCE SIGNS LIST

1 Non-inflating section
2, 3, 4, 6, 7, 8, 9 Yarn
5 Plain weave structure section
11, 12, 21, 22, 31, 32 Base fabric

The invention claimed is:

1. A bag body having thereinside restriction threads for restricting inflation, wherein the restriction threads comprise:
   first yarn extending inside the bag body from a non-inflating section to another non-inflating section;
   second yarn forming a base fabric of one side of an inflating section of the bag body, the second yarn leaving the base fabric of the one side, being caught on the first yarn or constituting a weave structure with the first yarn, and returning to the base fabric of the one side and being woven into the base fabric; and
   third yarn forming a base fabric of another side of the inflating section of the bag body, the third yarn leaving the base fabric of said another side of the inflating section, being caught on the first yarn or constituting a weave structure with the first yarn, and returning to the base fabric of said another side of the inflating section and being woven into the base fabric.

2. The bag body according to claim 1, wherein the restriction threads have a strength of 30 N/thread or higher and an elongation percentage of 16 to 30%.

3. The bag body according to claim 1, wherein the density of the restriction threads leaving the base fabric of the bag body is 0.1 to 1.5 thread/cm$^2$ relative to the area of the inflating section.

4. The bag body according to claim 1, wherein a region where the restriction threads are present is 10 to 95% of an area of the inflating section.

5. The bag body according to claim 1, wherein each length of the second yarn and the third yarn of the restriction threads from a point of leaving the base fabric to a point of returning to the base fabric is 5 to 40 cm.

6. The bag body according to claim 1, wherein a yarn constituting each of said base fabric of the bag body is made of polyethylene terephthalate (PET) or nylon 66 (N66).

7. The bag body according to claim 1, wherein the outside of the bag body is coated or laminated with a resin.

* * * * *